Patented Dec. 14, 1948

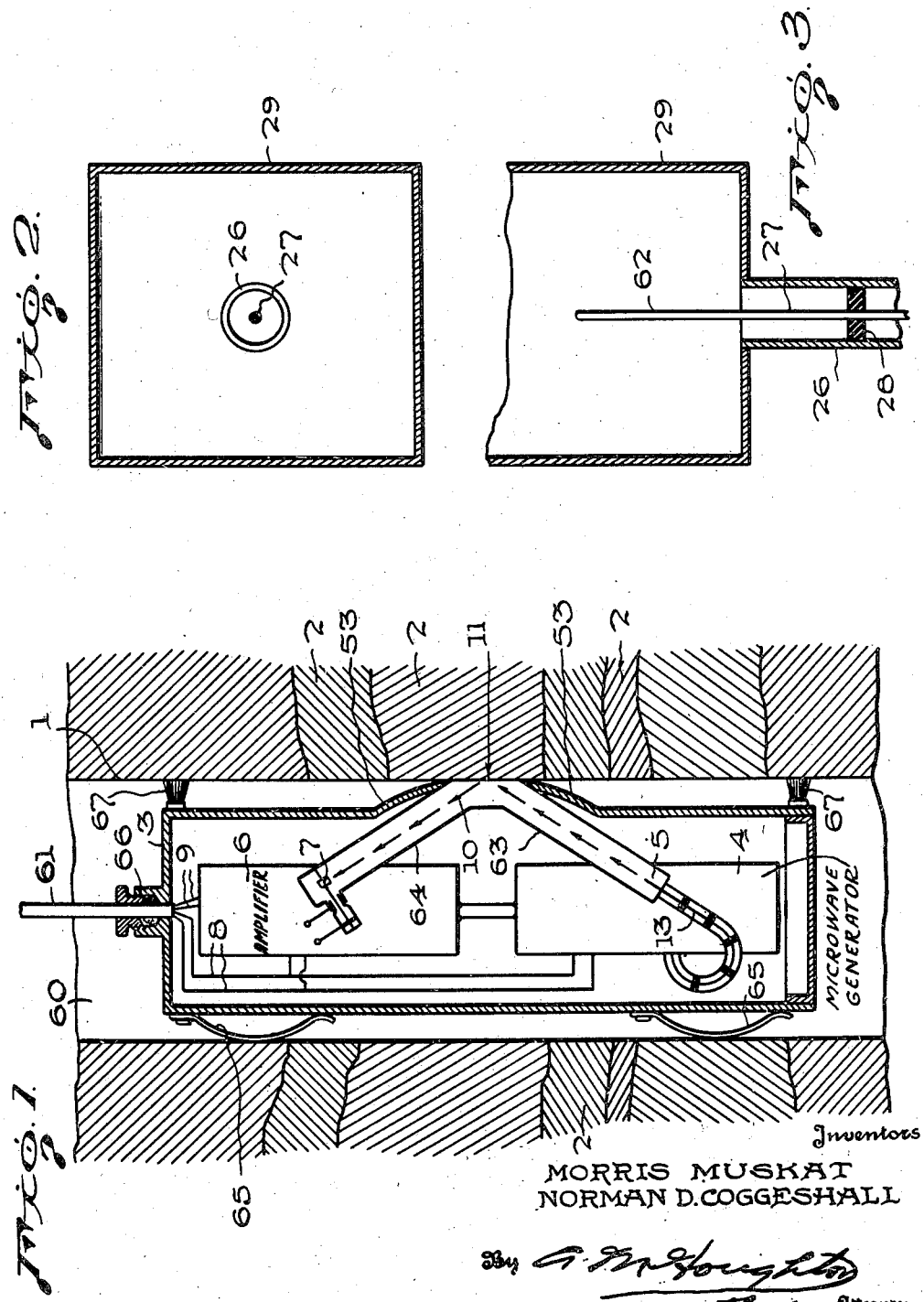

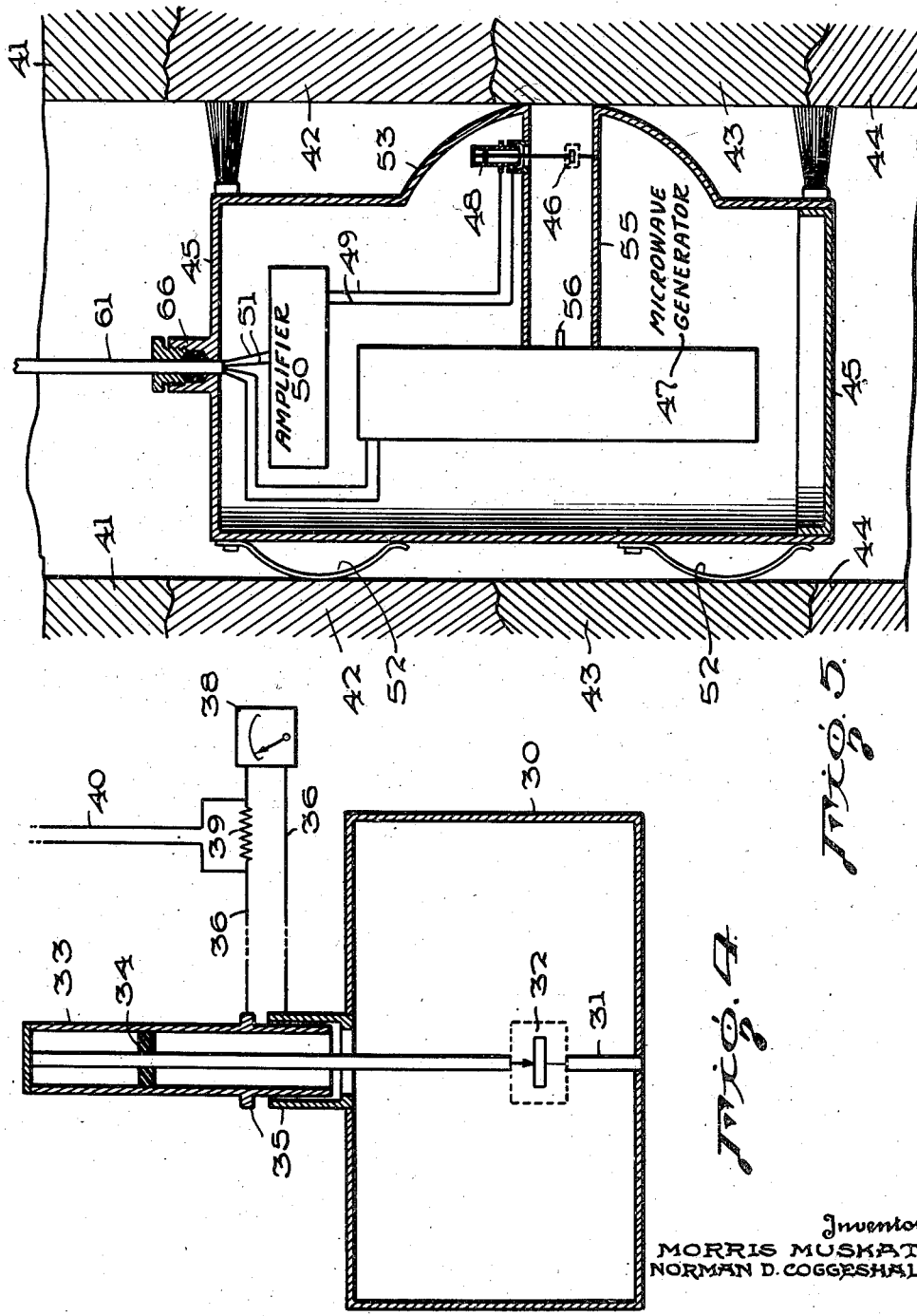

2,455,941

UNITED STATES PATENT OFFICE 2,455,941

GEOPHYSICAL PROSPECTING IN BOREHOLES BY MICROWAVES

Morris Muskat, Oakmont, and Norman D. Coggeshall, O'Hara Township, Allegheny County, Pa., assignors to Gulf Research & Development Company, Pittsburgh, Pa., a corporation of Delaware Application December 13, 1944, Serial No. 568,059

2 Claims. (Cl. 175—182)

This invention concerns a new and improved geophysical method and apparatus for borehole logging and more especially one involving the use of microwaves. More particularly it is a method and apparatus by means of which geological formations adjacent to the borehole may be logged with regard to their microwave reflection properties.

In the art of geophysical prospecting, when applied to boreholes, the methods thus far developed have consisted of two classes of measurement. In the first, the rock strata traversed by the borehole have been subjected to various types of energy excitation, and diffusion or propagation of such excitation has been measured and recorded at points distant from the source. From these measurements inferences are drawn regarding the intervening medium. In the second class, streams of particles or radiation have been directed at the face of the borehole and the reaction of the strata has been taken as an indication of the nature of the strata at the location where the stream has impinged upon them.

In the former class, the methods of excitation have been mainly either of the electrical or acoustic type. That is, electrical fields of zero or low frequency have been imposed on the rock strata, while the diffusion and transmission of these fields have been measured at distant points. The absolute magnitudes or differential magnitudes of the fields at these points have been taken as an indication of the intervening medium. In a similar way, elastic or acoustic measurements of the exposed strata have been used to correlate or identify rock formations. Because of the relatively low frequency or long wave lengths of the excitation fields, the values observed at distant points have represented averages over large masses of intervening strata, thereby giving a rather low resolving power in the differentiation of such strata. Moreover, the problems of the coupling of the exciting sources to the rock strata, as well as of the detecting instruments, have created considerable uncertainty regarding the significance of the absolute values of the measurements.

In the second class of borehole investigation methods, particle streams, such as those of neutrons, or extremely hard and short wave length electromagnetic radiations as γ-rays, have provided the means for determining the characteristics of the exposed faces of rock strata. Such methods enjoy the advantage of providing measurements of the characteristics of rock strata at the region of incidence of the particle or radiation stream of small areal extent. The disadvantage of this type of measurement, however, is that it may be difficult to provide a sufficiently high intensity source of the particle stream, such as neutrons. The same is true with respect to wave streams such as those of γ-rays. Moreover, the physical interpretation and meaning of the reactions of the rock strata to these particles or wave streams is rather obscure, and the correlation has to be largely empirical.

In the invention herein disclosed, a new method has been devised which obviates the disadvantages of the previously devised techniques. It is of the type related to the second class described above, and comprises essentially the method of directing beams of microwaves against the rock strata, and measuring or recording the intensity of the reflected or scattered beam. Microwaves comprise that class of electromagnetic waves whose wave length lies approximately between one meter and a fraction of a mm. From a physical point of view these possess many advantages over lower frequency electromagnetic waves, such as the radio-waves. Because of their extremely short wave length, they can be excited and transmitted as directed beams. The receiving apparatus can also be made of small dimensions. This question of apparatus dimensions is of significance, in that it permits their application in the limited confines of well bores. While electromagnetic waves, as radio waves, or even those in the low frequency region can also be generated within well bores, they cannot be transmitted or directed in beams without the use of transmitting antennas or equipment having dimensions comparable to the wave length. On the other hand, microwaves have similar attributes and their interaction with matter is of the same type as of radiowaves. This feature does not obtain, in the case of γ-rays. The similarity of microwaves to lower frequency electromagnetic radiation is of major importance with respect to the interpretation of the reaction of microwaves with the rock strata being explored. Thus, for example, both radio and microwaves are highly reflected by metallic or other conducting media. However, insulators provide easy transmission of microwaves and have low reflecting power for them.

It is accordingly an object of this invention to show a method and apparatus for borehole logging which is sensitive to electrical properties of the formations encountered.

Another object is to describe a method and apparatus for borehole logging which is responsive to the surface characteristics of the formations.

Still another object is to describe a method and apparatus for borehole logging which makes use of microwaves in investigating the properties of the formations.

A still further object is to describe a method and apparatus for borehole logging which measures the microwave reflection properties of the formations.

Our invention is described in detail and will be best understood by reference to the accompanying drawings in which, Fig. 1 shows one assembly of the borehole logging apparatus suspended in a well;

Figs. 2 and 3 show one form of microwave radiator which may be used;

Fig. 4 shows in transverse cross-section one form of microwave detector which may be used; and Fig. 5 shows another particular embodiment of our invention.

In Figure 1 we have shown a cross section of the earth, with borehole 60 and exposed face 1 of rock formations stratified as indicated by 2. Numeral 3 represents the external case of the microwave apparatus supported by cable 61 entering the apparatus by stuffing box and clamp 66. Cable 61 also supplies power to the apparatus through wires 8. Wires 9 are also carried through cable 61 and serve to transmit signals to the surface for observation and recording. Cable 61 is wound on a reel at the surface and there is provided conventional means for measuring the length of cable fed down into the hole or other means of determining the depth of unit 3. Also on the surface there may be conventional recording devices or control apparatus for other investigations simultaneously made in the well according to well known procedures.

The transmitting unit is housed in 4, and the microwaves generated in 4 and emanating from the radiator 5 follow the arrows along the wave guide 63 and after reflecting from the wall of the borehole at 11 proceed along wave guide 64 as arrow 10 to the detector 7 contained in receiving unit 6. Conductor cables 8 bring the power from the surface into the transmitting unit, and cables 9 transmit the received signals back to the surface. The reflected signals received at 7 may be subjected to amplification and transformation before being sent to the surface.

In order to remove from the walls of the borehole any mud cake which may cover the formations, the case 3 is provided with scrapers 67. A bumper or guide 53 is provided with an opening at 11 to permit the microwave radiation to impinge on the clean formation. Springs 65 are provided on the opposite side of unit 3 in order to maintain guide 53 in contact with the formation wall. The well fluid may enter wave guides 63 and 64 and in order to prevent interference with the microwave transmission the fluid must be electrically non-conducting. The well may be flushed or conditioned with fresh water or with an oil base drilling fluid having low electrical conductivity.

Unit 4 represents any known type of microwave generator, such as a Klystron. These generators are of the velocity modulated electron stream type and supply microwave energy through a coaxial cable designated as 13. The energy is emitted from radiator 5 which is shown in more detail in Figs. 2 and 3, Fig. 2 being in section and Fig. 3 in elevation.

In Figs. 2 and 3, the sheath of the coaxial cable supplying microwave energy is shown at 26 and the central conductor at 27. These are kept separated by insulator 28 in the conventional way. The cable is joined to a wave guide 29 and the central wire has an extension 62 which extends into the cavity of the wave guide 29. The wave guide 29, Figs. 2 and 3, or 63, Fig. 1, may be either circular or rectangular in cross section and of dimensions in keeping with the frequency used in a well known relationship.

Referring again to Fig. 1, after the microwaves leave radiator 5 and proceed along wave guide 63 they impinge on the rock strata in the region 11. Here they may be reflected, the fraction of energy reflected being a characteristic property of the formation encountered. Some reflection takes place in the direction of wave guide 64 which is similar in construction to 63. The reflected energy is picked up by detector 7 which may be of a known form.

A suitable type of radiation detector would be one having the transverse cross-section illustrated in Fig. 4. This consists of a probe 31 extending through the wall 30 of the wave guide, a rectifying crystal 32 included in the length of the probe, a by-pass condenser 35, a tuning cylinder 33 and tuning piston 34, leads 36 taking the rectified component of the current to a resistance 39 and a current meter 38. As the probe extends through the wave guide 30 and makes electrical contact with it, it tends to absorb a considerable amount of electromagnetic energy. To make it measurable the crystal 32 gives rectification and the bypass condenser 35 serves as a shunt for the unrectified component. The tuning cylinder and piston 33 and 34, respectively, allow one to change the inherent impedance of the wave guide so as to select conditions best suited for maximum sensitivity. The rectified currents can be read directly on the meter 38 or the voltage drop across 39 may be fed into an electronic amplifier by means of leads 40. From there it may be fed into a recording device. Alternatively, 38 could be made a recording meter, so as to record the received signals.

In Fig. 5 is drawn the general arrangement of the component parts assembled in a manner to practice the invention in the special case of normal incidence of the microwaves on the strata being logged. Numerals 41, 42, 43 and 44 illustrate strata adjacent to the borehole, while 45 represents the outside case for the logging unit suspended by conductor cable 61 passing through stuffing box 66. Numeral 56 denotes a radiating antenna for emitting energy in microwave form into the wave guide 55. The microwaves are guided down the wave guide to the opposite end which is in contact with the adjacent strata. Here some of the energy is transmitted into the strata and some is reflected, the relative proportions depending upon the nature of the strata at that point. The relative proportions can be determined by a knowledge of the energy output of the microwave generator 47 and the amount of energy picked up by the detector probe 46. The energy detected by 46 is proportional to the sum of the amount transmitted from the antenna 56 to that point plus the amount reflected from the strata. The energy output of the microwave generator can be determined from a knowledge of its efficiency and its operating parameters, such as currents and voltages, which may be measured or kept constant. Numeral 48 represents the tuning piston part of the detector, such as shown in detail in Fig. 4, and in 46 is located the conventional crystal rectifier, and 49 are leads which take the rectified signal to an amplifier 50 which sends its signals to the surface of the ground through wires 51. In order to allow the unit to adjust itself to irregularities of the borehole a bumper or guide 53 is provided. Fig. 5 also indicates an arrangement of springs 52 whereby the wave guide is held in contact with the walls of the borehole.

Any characteristic of the reflected microwave beam, such as magnitude, phase or wave form may be observed in the receiver 6. For a measurement of the reflection coefficient of the rock strata between the transmitting and receiving units, the ratio of intensity of the reflected beam to that of the incident beam constitutes the identifying characteristic. If the incident energy is kept constant by using at 4 a constant output microwave generator, then the reflected intensity itself will serve as a measure of the reflection coefficient. Broadly speaking, conducting beds, such as salt water strata, will give high reflected intensities, whereas non-conducting formations such as free gas zones, or strata saturated with oil, will give reflected beams of low intensity. Thus, a record of the variation of the reflected beams will provide not only a means of identifying rocks, but will also give an indication of the fluid content.

The invention and method herein disclosed may be operated at a frequency chosen so as to be appropriate to the average strata traversed by the well bore, or the measurement may be conducted in such a way as to study the variation of the reflected beams with frequency. In particular, the frequency dispersion behavior of the rock formations may be used to indicate the nature of the strata. When granular media, such as rock strata, are irradiated by microwaves of wave lengths comparable to the particle dimensions, pronounced resonance, absorption and scattering effects will take place. By observing the frequency of the incident radiation which gives rise to such resonance effects, the detailed structure and characteristics of the medium may be obtained. This type of exploration is to be included in the scope of this invention. For this application unit 4 in Fig. 1 may contain a variable frequency transmitter and the receiving unit 6 may be a variable frequency or tuned receiver or other equivalent microwave detector. In general, 4 and 6 will be of the cavity resonator type, although this invention is not to be limited to the use of such particular microwave equipment.

The angles of incidence and reflection are not limited to those shown in Figures 1 and 5, but may be any angle. While in Figure 1 we have shown the observation angle of wave guide 64 to be the same as the incident angle of wave guide 63 such as would result from a specular type of reflection, the invention is not to be limited to this condition. The observation angle may be different from the incident angle, in which case the intensity of scattered reflection may be measured.

In order to successfully apply the method of this invention it is necessary to remove from the borehole any electrically conducting material such as drilling mud or salt water. Holes drilled by cable tool methods and which are dry are advantageously logged by our invention. Rotary drill holes may first be flushed or conditioned with fresh water or more preferably, an electrically insulating oil base drilling fluid may be used. Furthermore any conducting sheath on the borehole wall will shield the formation, and such sheath or so-called mud cake must be removed either by scrapers or by other methods known in the art.

What we claim is:

1. A method of earth testing for use in logging a borehole which comprises exciting a tubular open-ended wave guide with microwave energy, terminating said wave guide by peripheral contact with the side wall of the borehole so that the axis of the wave guide makes an acute angle with the plane tangent to the borehole wall, exciting from substantially the same microwave-terminating portion of the borehole wall a second tubular open-ended wave guide directed to receive microwaves reflected from said termination and measuring the microwave excitation of the second wave guide.

2. Borehole logging apparatus adapted for use against a borehole wall to determine a characteristic thereof comprising two intersecting open-ended wave guides having a common end opening at their intersection, said opening constituting an output end of the first wave guide and an input end of the second wave guide, the opening being shaped so as to engage the borehole wall substantially throughout the periphery of the opening, whereby said wave guides are terminated by the borehole wall when put into engagement therewith, a microwave generator connected to the input end of the first wave guide, microwave excitation measuring means connected to the output end of the second wave guide and means for urging the periphery of said opening substantially into contact with the borehole wall.

MORRIS MUSKAT.
NORMAN D. COGGESHALL.

REFERENCES CITED

The following references are of record in the file of this patent:

UNITED STATES PATENTS

| Number | Name | Date |
|---|---|---|
| 1,838,371 | Deardorff | Dec. 29, 1931 |
| 2,075,808 | Fliess | Apr. 6, 1937 |
| 2,139,460 | Potapenko | Dec. 6, 1938 |
| 2,334,475 | Claudet | Nov. 16, 1943 |
| 2,346,481 | Garrison | Apr. 11, 1944 |